(12) United States Patent
Johnson

(10) Patent No.: US 9,819,514 B2
(45) Date of Patent: Nov. 14, 2017

(54) PROCESSING STREAM MESSAGES

(71) Applicant: Adtran Inc., Huntsville, AL (US)

(72) Inventor: Milton Jay Johnson, Owens Cross Roads, AL (US)

(73) Assignee: Adtran Inc., Huntsville, AL (US)

( * ) Notice: Subject to any disclaimer, the term of this patent is extended or adjusted under 35 U.S.C. 154(b) by 246 days.

(21) Appl. No.: 14/697,055

(22) Filed: Apr. 27, 2015

(65) Prior Publication Data

US 2016/0315786 A1    Oct. 27, 2016

(51) Int. Cl.
*H04L 12/46*    (2006.01)
*H04L 12/18*    (2006.01)
*H04L 12/42*    (2006.01)

(52) U.S. Cl.
CPC .......... *H04L 12/4641* (2013.01); *H04L 12/18* (2013.01); *H04L 12/42* (2013.01)

(58) Field of Classification Search
CPC ............ H04L 12/4641; H04Q 11/0066; H04Q 11/0067; H04Q 11/0071
See application file for complete search history.

(56) References Cited

U.S. PATENT DOCUMENTS 6,967,949 B2 * 11/2005 Davis .................. H04L 12/2856
370/389
7,054,277 B1 * 5/2006 Lau ..................... H04L 12/4679
370/254

* cited by examiner

*Primary Examiner* — Chandrahas Patel
(74) *Attorney, Agent, or Firm* — Fish & Richardson P.C.

(57) ABSTRACT

Methods, systems, and apparatus for processing stream messages are disclosed. In one aspect, a downstream message formatted according to an asymmetric communication protocol is received over a downstream Virtual Local Area Network (VLAN). An upstream message is generated in response to receiving the downstream message. The downstream message is transmitted on the downstream VLAN. The upstream message is transmitted on an upstream VLAN that is different than the downstream multicast VLAN.

23 Claims, 5 Drawing Sheets

PROCESSING STREAM MESSAGES

BACKGROUND

This specification relates to processing stream messages.

In a telecommunication network, local area networks (LANs) can be used to transmit multicast streams. In one example, the multicast streams may include Internet Protocol (IP) videos. The multicast streams may be transmitted from a multicast source to a LAN.

SUMMARY

In general, one innovative aspect of the subject matter described in this specification can be embodied in methods for processing stream messages. Methods can include receiving, over a downstream Virtual Local Area Network (VLAN), a downstream message formatted according to an asymmetric communication protocol; generating, in response to receiving the downstream message, an upstream message; transmitting the downstream message on the downstream VLAN; and transmitting the upstream message on an upstream VLAN that is different than the downstream multicast VLAN.

These and other embodiments can each optionally include one or more of the following features. The upstream VLAN can be created by a multicast message specifying one or more characteristics of the upstream VLAN. Methods can include receiving a different upstream message on the upstream VLAN; and transmitting, without processing, the different upstream message on the upstream VLAN. The asymmetric communication protocol can be an Internet Group Management Protocol (IGMP). The downstream message can be an IGMP query message. The upstream message can be an IGMP report message. The downstream VLAN and the upstream VLAN can operate on the same physical Local Area Network (LAN).

Methods can include receiving, by a given node of a first ring network and over a first VLAN, a downstream message from a root node of the first ring network; transmitting, by the given node and over the first VLAN, the downstream message to a downstream node of a second ring network; receiving, by the given node and over the first VLAN, an upstream message from the downstream node of the second ring network; and transmitting, by the given node, the upstream message to the root node over a second VLAN. Methods can include receiving, by the given node and over the second VLAN, an upstream message from another node of the first ring network; and forwarding, without processing and over the second VLAN, the upstream message to the root node of the first ring network.

Methods can include determining, by a given node, that downstream messages and upstream messages are to be transmitted over a ring network using an asymmetric communications protocol; in response to the determination: establishing, by the given node, a first VLAN over which the downstream messages are transmitted; and establishing, by the given node, a second VLAN over which the upstream messages are transmitted, the second VLAN being different than the first VLAN.

Particular embodiments of the subject matter described in this specification can be implemented so as to realize one or more of the following advantages. Configuring separate VLANs for upstream and downstream messages can enable the nodes on a LAN to identify the types of the messages without processing. A node can, therefore, determine that a multicast stream message is an upstream message and forward the message without processing. The subject matter described in this specification reduces the processing load and power consumption on the node, reduces the processing delay of multicast stream messages, and increases network switching performances. Thus, the subject matter of this specification improves at least network communication technologies.

The details of one or more embodiments of the subject matter described in this specification are set forth in the accompanying drawings and the description below. Other features, aspects, and advantages of the subject matter will become apparent from the description, the drawings, and the claims.

DESCRIPTION OF DRAWINGS

Like reference numbers and designations in the various drawings indicate like elements.

DETAILED DESCRIPTION

Figure 1:
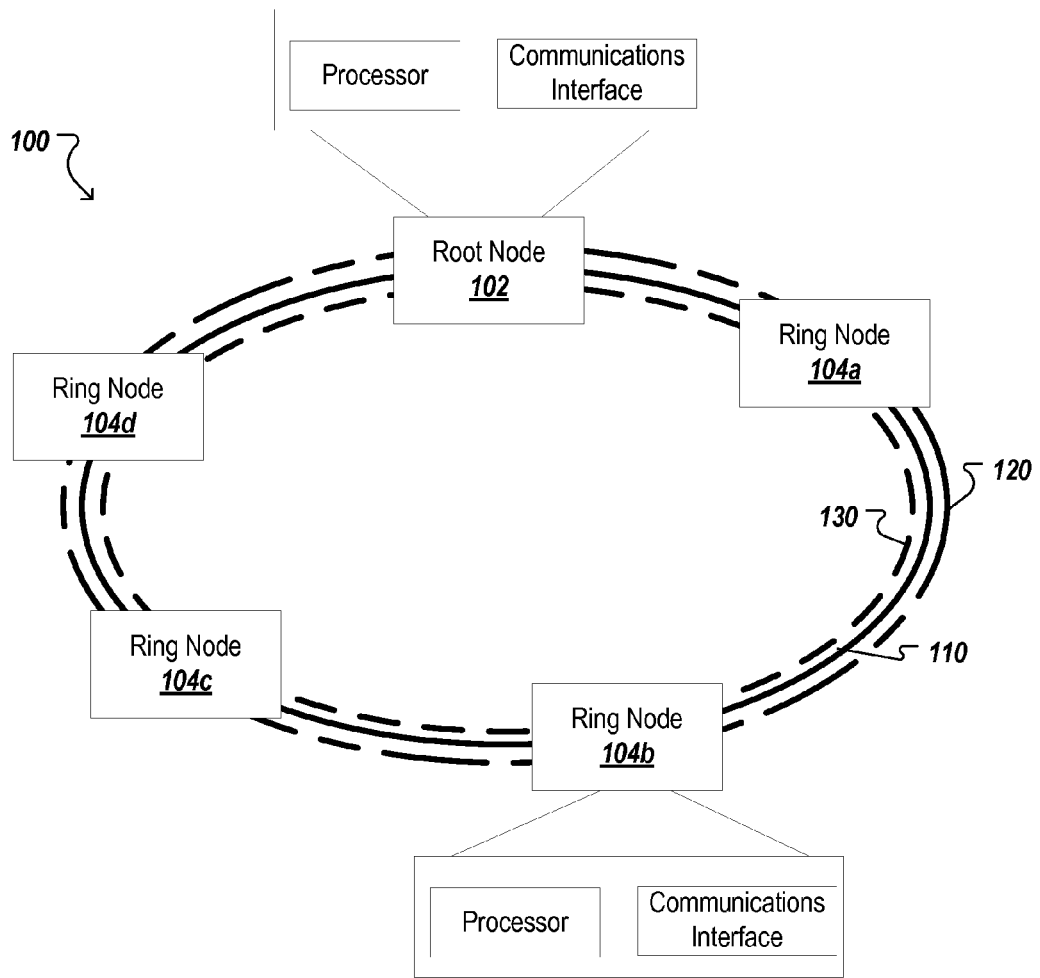
FIG. 1 is a block diagram of an example ring network.

This document describes communication techniques that can be used in ring networks. In some cases, a local area network (LAN) can include a root node and one or more ring nodes. The root node can receive multicast streams from a multicast source and transmit the multicast streams to the ring nodes on the LAN. In some cases, a ring node on the LAN can serve one or more subtended nodes on a subtended network. In some cases, the ring node can have a lower bandwidth connection to the subtended network. Therefore, the ring node may perform multicast stream processing on the multicast streams that the ring node receives before forwarding to the subtended networks. For example, the ring node may forward only the streams that have been requested by one of the subtended nodes on the subtended networks.

In some cases, the root node and/or the ring nodes may transmit, receive, and process multicast stream messages for the multicast stream processing discussed above. For example, a root node can transmit downstream messages to the ring nodes on the LAN. The downstream messages can include information about the different streams that are included in the multicast stream that is received by the root node. A ring node on the LAN may receive the downstream message, process the downstream message, and transmit the downstream message to the next ring node on the LAN. If the ring node serves a subtended network, the ring node may also transmit the downstream message to the subtended nodes on the subtended network. The ring node can also transmit an upstream message to the root node. The upstream message can specify the streams that the ring node requests to receive. If the ring node serves a subtended network, the ring node may also receive upstream message from a subtended node on the subtended network, and forward the upstream message to the root node. In one example, the downstream and upstream messages are formatted according to the Internet Group Management Protocol (IGMP).

In some cases, the multicast stream messages, e.g., the downstream and upstream messages discussed above, can be transmitted in both directions on the LAN. In some cases, e.g., when there is either a physical or a virtual break on the LAN, the multicast stream messages may be transmitted between the root node and a ring node in one direction. In these or other cases, a ring node may process both the upstream and downstream messages to determine the type of the messages and then forward the messages, even though the ring node does not act on the upstream messages. The processing of upstream messages increases the processing load on the ring nodes, slows down the forwarding of upstream messages to the root node, and reduces network switching performance. The processing delay increases as the number of nodes on the LAN and the number of subtended networks increases.

As discussed in more detail with respect to FIGS. 1-5, in some cases, two virtual LANs (VLANs) can be used to transmit the multicast messages. For example, a downstream VLAN can be used to transmit the downstream messages and an upstream VLAN can be used to transmit the upstream messages. A ring node can determine that a multicast stream message is a downstream message if the multicast stream message is received over the downstream VLAN. The ring node can process and forward the downstream message over the downstream VLAN. The ring node can also determine that a multicast stream message is an upstream message if the multicast stream message is received over the upstream VLAN. The ring node can forward the upstream message on the upstream VLAN without processing the upstream message.

In some cases, a ring node that serves a subtended network can process the multicast stream message that the ring node receives from the subtended network, and determine which VLAN will be used to transmit the multicast stream message. For example, the ring node can receive a multicast stream message from a subtended node on the subtended network, process the message to determine that the message is an upstream message, and transmit the message over the upstream VLAN to the root node.

FIG. 1 is a block diagram of an example ring network 100. The example ring network 100 includes a root node 102 that communicates with ring nodes 104a-d over a physical Local Area Network (LAN) 110.

The physical LAN 110 includes any application, hardware, software, firmware, or combination thereof configured to transmit data packets using LAN protocols. In some cases, the physical LAN 110 can include communication devices that are connected through various copper wire cables, optical cables, or a combination thereof. In these or other cases, the communication devices can use Ethernet, Token Rings, or other LAN protocols to transmit data packets over the physical LAN 110. In some cases, the physical LAN 110 can include communication devices that are connected through wireless interfaces. In these or other cases, the communication devices can use Wireless LAN (WLAN) protocols, e.g., the Institute of Electrical and Electronics Engineers' (IEEE) 802.11 protocols, to transmit data packets over the physical LAN 110.

As illustrated, a Virtual LAN (VLAN) 120 and a VLAN 130 are configured on the physical LAN 110. In some cases, more than one VLAN can be configured on the same physical LAN. In these or other cases, the physical LAN can be partitioned into multiple domains, and each domain represents a VLAN. Data packets can be transmitted within individual domains on the same physical LAN.

In some cases, a VLAN can be implemented by using different ports. For example, one port can be designated to one VLAN and another port can be designated to another VLAN. In this or other examples, a transmitting communication device on the physical LAN can use different ports to transmit data packets in different groups. A receiving communication device can identify data packets from different VLANs based on the ports that the data packets are received at.

Alternatively or additionally, a VLAN can be implemented by using tagging. For example, a data packet can include a tag. The tag can represent a VLAN identifier of the data packet. Therefore, a transmitting communication device can transmit data packets on different VLANs by inserting or editing the tag of the data packet. A receiving communication device can identify data packets from different VLANs by reading the tags of the data packets.

As illustrated, the ring network 100 includes the root node 102 and the ring nodes 104a-d. The root node 102 and the ring nodes 104a-d include any application, hardware, software, firmware, or combination thereof configured to transmit and receive data packets over the VLANs 120 and 130. Examples of the root node 102 and the ring nodes 104a-d can include a router, a personal computer (PC), a laptop, a computer work station, a cellular phone, a smart phone, a tablet, or other communication device having components for communicating with other communication devices over the physical LAN 110. In some cases, as illustrated, the root node 102 and any of the ring nodes 104a-d can include a communications interface that is configured to transmit and receive data packets over a telecommunications network, e.g., the ring network 100. The root node 102 and any of the ring nodes 104a-d can also include one or more hardware processors that are coupled with the communications interface. The one or more hardware processors can be configured to execute instructions and manipulate data to perform the operations described with reference to the root node 102 or any of the ring nodes 104a-d.

The root node 102 is configured to receive multicast streams from a multicast source and transmit the multicast streams to the ring nodes 104a-d. In some cases, the root node 102 is configured to perform stream processing for the ring network 100. For example, the root node 102 can receive a multicast stream that includes multiple streams. The root node 102 can select a subset of streams in the multicast stream and transmit the subset of streams to the ring nodes 104a-d.

In some cases, the subset of streams provided to the ring nodes 104a-d has been requested by at least one of the ring nodes 104a-d. For example, the root node 102 can receive an Internet Protocol (IP) video stream from a multicast source. The IP video stream can include streams of multiple channels, some of which have been requested by at least one of the ring nodes 104a-d. The root node 102 can transmit the requested channels of the IP video stream over the ring network 100 and not transmit the channels that have not been requested by any ring node based on the channel requests received from the ring nodes 104a-d.

In some cases, the root node 102 can query the ring nodes 104a-d to obtain requests for channels and/or streams. For example, the root node 102 can transmit a downstream query message on the VLAN 120 to the ring nodes 104a-d. A ring node, e.g., any of the ring nodes 104a-d, can receive the downstream query message on the VLAN 120.

In some cases, the downstream query message can include information about the different streams that are included in the multicast stream that is received by the root node 102. Examples of the information about the different streams can include identifiers of the streams, source addresses of the streams, or a combination thereof. In one example, the downstream query message is an IGMP query message.

Each ring node can process the received messages on the VLAN 120. For example, each ring node can decode the received message to determine that the received message is a downstream query message, and determine whether to request any of the streams identified in the downstream query message. When a ring node determines that it is to request one or more streams identified in the downstream query message, the ring node can generate an upstream message that includes a request for the one or more streams. The upstream message can specify the streams that the ring node is requesting. The ring node can transmit the upstream message on the VLAN 130.

In some cases, if the ring node determines that it no longer needs to receive a given stream that it is already receiving, the upstream message can identify the given stream and specify that the ring node no longer requests that given stream.

In one example, the upstream message includes an IGMP report message, which indicates a request for a stream. In another example, the upstream message includes an IGMP leave message, which indicates a stream is no longer requested. The root node 102 can receive the upstream message and determine the streams that are currently requested by the ring nodes in the ring network 100.

In some cases, each of the ring nodes 104a-d can be configured to process all messages received over the VLAN 120 and take action based on the processing. For example, when the ring node receives a message on the VLAN 120, the ring nodes can process the message to determine whether it is an upstream message (e.g., propagating toward the root node 102) or a downstream query message (e.g., propagating away from the root node 102). When the ring node determines that the message is a downstream query message based on the processing, the ring node can further determine whether to transmit an upstream message in response to the downstream query message (e.g., whether to request an available channel). When the ring node determines that the message is an upstream message based on the processing, the ring node can transmit the received message on the VLAN 120 to the next ring node that is next closest to the root node 102 (or to the root node 102 if there are no intervening ring nodes between the ring node transmitting the message and the root node 102).

The ring nodes 104a-d generally forward upstream messages to the next ring node (or root node 102) without taking any other action. Therefore, if the ring nodes and/or the ring network 100 are configured to enable the ring nodes to determine that a message is an upstream message without requiring the ring nodes to process the message, the forwarding of the upstream messages will occur more quickly and the processing required by the ring nodes will be reduced.

In some implementations, the ring network can include a VLAN 130 in addition to the VLAN 120. The VLAN 130 can be designated as the VLAN over which upstream messages are transmitted, while the VLAN 120 can be designated as the VLAN over which downstream query messages are transmitted. As such, when the ring nodes 104a-d receive a message on the VLAN 130, the ring nodes 104a-d can determine that the received message is directed to the root node without processing the contents of the message. Therefore, the ring nodes 104a-d can transmit (e.g., forward) the received message on the VLAN 130 to the next ring node in the ring network 100 without processing the received message. This approach can reduce the amount of messages that the ring node processes, and therefore reduces the computation complexities required of the ring node and the power consumption in the ring node. In addition, the transmission delay of the upstream message can be reduced relative to the delay associated with the ring node processing each message (e.g., upstream and downstream).

In some cases, the VLANs 120 and 130 can be created by network provisions. For example, a network administrator can configure the VLANs 120 and 130 over the physical LAN 110. Alternatively or additionally, the VLANs 120 and 130 can be created by the root node 102. For example, the root node 102 can transmit a multicast message over the physical LAN 110. The multicast message can specify one or more characteristics of a VLAN, e.g., the VLANs 120 and 130. The one or more characteristics can include the ports of the VLANs, the tags of the VLANs, or a combination thereof. The ring nodes 104a-d can receive the multicast message and identify the VLANs based on the one or more characteristics included in the multicast message. Based on the multicast message, the ring nodes can be configured to transmit upstream messages on the VLAN 130 and transmit downstream query messages on the VLAN 120. Similarly, the ring nodes can be configured to process messages received on the VLAN 120. The ring nodes can also be configured to forward to the next ring node (or root node 102) messages received on the VLAN 130 without processing the messages received on the VLAN 130. As discussed in more detail below, the multiple VLAN configuration illustrated in FIG. 1 can also be used in multi-ring networks.

Figure 2:
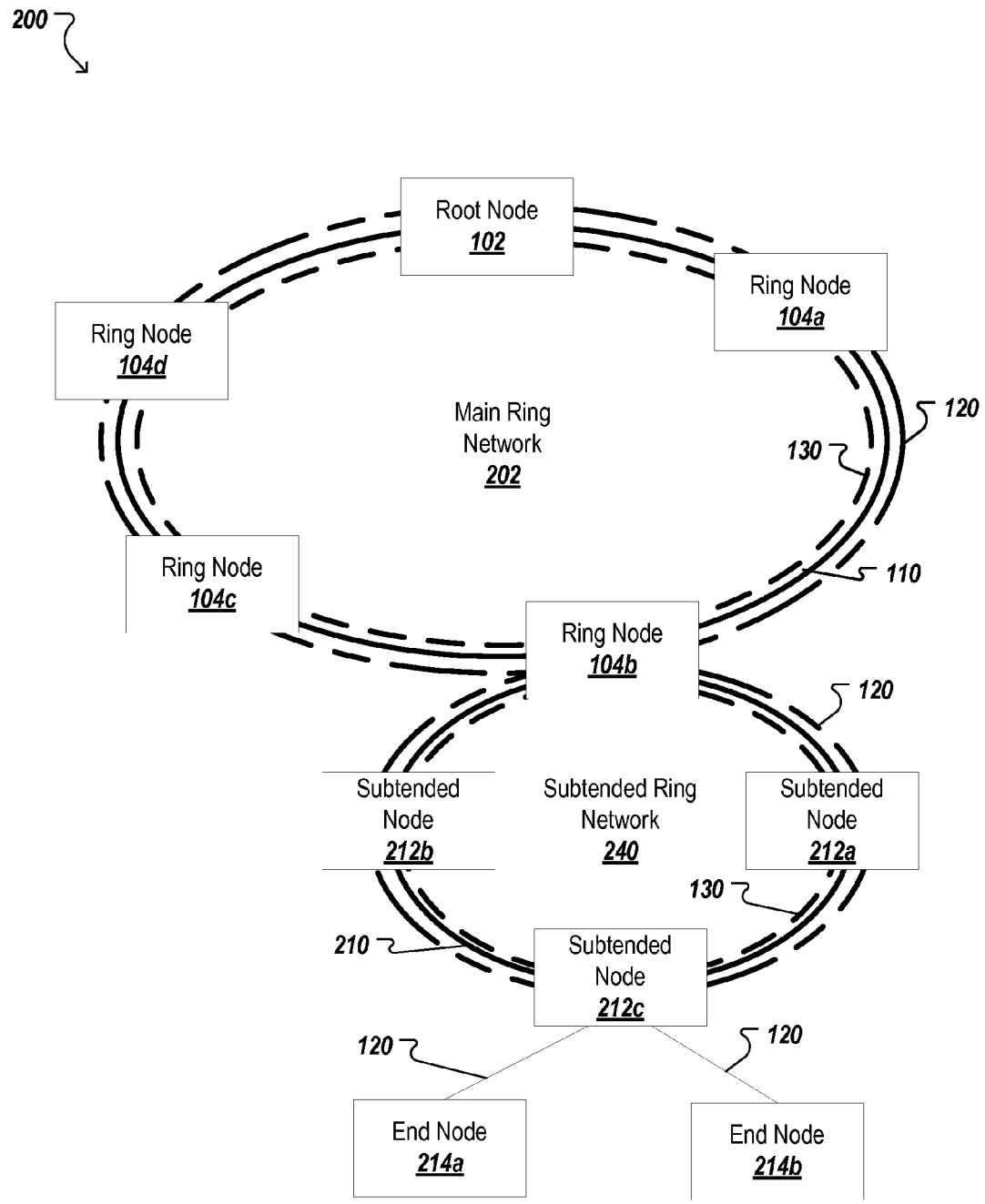
FIG. 2 is a block diagram of an example telecommunication network that includes multiple ring networks.

FIG. 2 is a block diagram of an example telecommunication network 200 that includes multiple ring networks. As illustrated, the example telecommunication network 200 includes a main ring network 202. The main ring network 100 includes a root node 102 that communicates with ring nodes 104a-d. The main ring network 202 includes VLANs 120 and 130. As discussed above with reference to FIG. 1, the root node 102 transmits downstream query messages over the VLAN 120 and receives upstream messages over the VLAN 130. When the ring nodes 104a-d receive a message over the VLAN 120 on the main ring network 100, the ring nodes 104a-d can process the message and determine whether to generate a message in response. When the ring nodes 104a-d receive a message over the VLAN 130 on the main ring network 100, the ring nodes 104a-d can forward the message to the next ring node (or root node 102) without processing the message.

The example network 200 also includes a subtended ring network 240. The subtended ring network 240 includes the ring node 104b that communicates with subtended nodes 212a-c over a physical LAN 210. As illustrated, the subtended ring network 240 is connected to the main ring network 202 through the ring node 104b. The ring node 104b can be configured to transmit data packets received on the main ring network 202 over the subtended ring network 240. The ring node 104b can also be configured to transmit data packets received on the subtended ring network 240 to the main ring network 202. In some cases, the ring node 104b is configured to perform functions as a root node for the subtended ring network 240. For example, the ring node 104b can receive the multicast streams over the main ring network 202 and select, based on requests received over the subtended ring network 240, a subset of streams to transmit to the subtended nodes 212*a-c* over the subtended ring network 240.

As illustrated, the subtended ring network 240 also includes the subtended nodes 212*a-c*. The subtended nodes 212*a-c* ring nodes include any application, hardware, software, firmware, or combination thereof configured to transmit and receive data packets on the subtended ring network 240.

In some cases, as illustrated, two VLANs, e.g., the VLANs 120 and 130, can also be configured on the subtended ring network 240. As described above, the VLAN 120 can be used to transmit downstream query messages on the subtended ring network 240, and the VLAN 130 can be used to transmit upstream messages on the subtended ring network 240. The ring node 104*b* can receive a downstream query message over the VLAN 120 on the main ring network 202, and transmit the downstream query message over the VLAN 120 to a downstream node, e.g., the subtended nodes 212*a-c*, on the subtended ring network 240. The ring node 104*b* can also receive an upstream message from the subtended nodes 212*a-c* over the VLAN 130 on the subtended ring network 240 and transmit the upstream message on the VLAN 130 to the root node 102 on the main ring network 202.

As discussed above, the ring node (e.g., ring node 104*b*) that connects a subtended ring network (e.g., 240) to another network (e.g., 202) can be configured to function as a root node for the subtended network, and can be referred to as a subtended root node. In some implementations, the subtended root node (e.g., ring node 104*b*) stores request data specifying which of the subtended nodes (e.g., 212*a*-212*c*) has requested various streams in the multicast stream provided over the other ring network (e.g., 202) that is connected to the subtended root node. In order to maintain and/or update the request data, the subtended root node may be required to process upstream messages that are received from the subtended nodes. As such, the subtended root node can be configured to process messages that are received over the VLAN 120 and messages received over the VLAN 130. Alternatively, or additionally, the subtended root node could obtain the request data from another root node (e.g., root node 102) after the root node processes upstream messages received from the subtended ring network 240.

As discussed previously, in some cases, the VLANs 120 and 130 on the subtended ring network 240 can be created by network provisions. Alternatively or additionally, the VLANs 120 and 130 on the subtended ring network 240 can be created by the ring node 104*b*. For example, the ring node 104*b* can transmit a multicast message to the subtended nodes 212*a-c* to configure the VLANs 120 and 130. In some cases, the ring node 104*b* can determine that both downstream query messages and upstream messages will be transmitted over the subtended ring network 240. In response to the determination, the ring node 104*b* can transmit the multicast message to configure the VLANs 120 and 130.

In some cases, only one VLAN, e.g., the VLAN 120, is configured on the subtended ring network 240. In these or other cases, both the downstream query messages and the upstream messages are transmitted to subtended nodes 212*a-c* over the VLAN 120. The ring node 104*b* can detect the types of messages that the ring node 104*b* received from the VLAN 120 on the subtended ring network 240. Based on the detected type of message, the ring node 104*b* can determine which VLAN (e.g., VLAN 120 or VLAN 130) the received message is to be sent over.

For example, assume that the ring node 104*b* receives a downstream query message from the VLAN 120 on the main ring network 202. In this example, the ring node 104*b* can send the downstream query message to subtended nodes 212*a-c* using the VLAN 120. Further assume, for purposes of example, that the ring node 104*b* receives an upstream message from one or more of the subtended nodes 212*a-c* in response to the downstream query message and that the upstream message is received over the VLAN 120. In this example, the ring node 104*b* can decode the received message and determine that the received message is an upstream message. Based on the determination that the message is an upstream message, the ring node 104*b* can transmit the upstream message to the root node 102 over the VLAN 130 on the main ring network 202. In this example, the other ring nodes (e.g., ring nodes other than 104*b*) of the main ring network 202 will not process the upstream message because the upstream message was transmitted over the VLAN 130.

In some cases, a ring node or a subtended node in a ring network can also communicate with end nodes outside of a ring network. For example, as illustrated in FIG. 2, the subtended node 212*c* communicates with end nodes 214*a-b*. The end nodes 214*a-b* can be any communication devices that transmit data packets to the subtended node 212*c* and receive data packets from the subtended node 212*c*. In these or other cases, the subtended node 212*c* can be configured to function as a root node for the end nodes 214*a-b* and can be referred to as an end root node. In some implementations, the end root node (e.g., the subtended node 212*c*) stores request data specifying which of the end nodes (e.g., 214*a-b*) has requested various streams in the multicast stream provided over the other ring network (e.g., 240) that is connected to the end root node. In order to maintain and/or update the request data, the end root node may be required to process upstream messages that are received from the end nodes. Alternatively, or additionally, the end root node could obtain the request data from another root node (e.g., ring node 104*b*) after the root node processes upstream messages received from the end nodes.

In some cases, as illustrated, only one VLAN, e.g., the VLAN 120, is configured to transmit data between the end root node and the end nodes. In these or other cases, both the downstream query messages and the upstream messages are transmitted to end nodes 214*a-b* over the VLAN 120. The subtended node 212*c* can detect the types of messages that the subtended node 212*c* receives over the VLAN 120 from the end nodes 214*a-b*. Based on the detected type of message, the subtended node 212*c* can determine which VLAN (e.g., VLAN 120 or VLAN 130) the received message is to be sent over on the subtended ring network 240.

Figure 3:
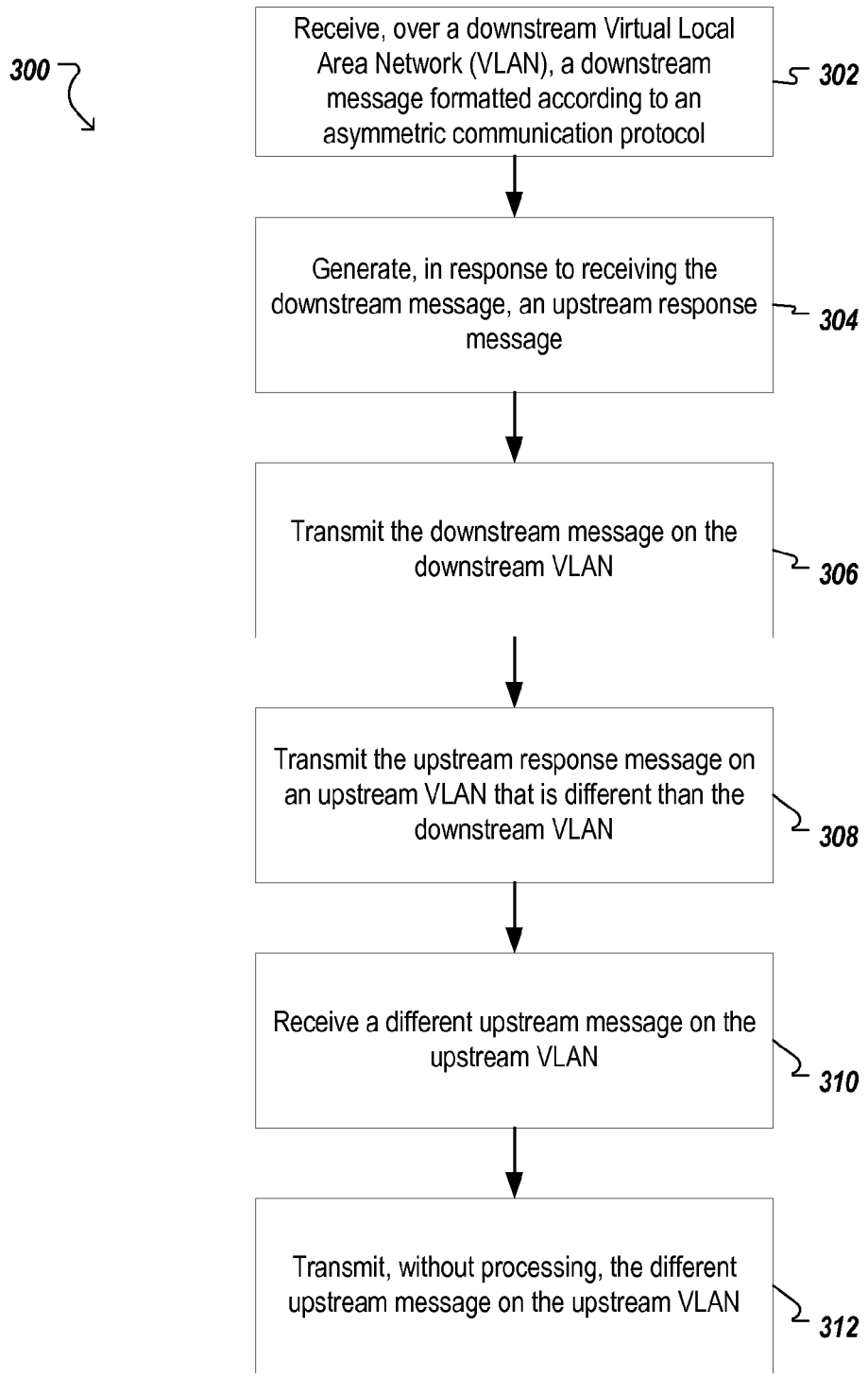
FIG. 3 is a flowchart of a first example process for processing stream messages.

FIG. 3 is a flowchart of an example process 300 for processing stream messages. The example process 300 can be performed, for example, by one or more devices such as those described with reference to FIGS. 1-2. The example process 300 can also be implemented as instructions stored on a non-transitory, computer-readable medium that, when executed by one or more devices, configures the one or more devices to perform and/or cause the one or more devices to perform the operations of the example process 300.

A downstream message formatted according to an asymmetric communication protocol is received over a downstream Virtual Local Area Network (VLAN) (302). In some cases, the asymmetric communication protocol is an Internet Group Management Protocol (IGMP). In some cases, the downstream message is an IGMP query message.

An upstream message is generated in response to receiving the downstream message (304). In some cases, the upstream message is an IGMP report message. The downstream message is transmitted on the downstream VLAN (306).

The upstream message is transmitted on an upstream VLAN that is different than the downstream multicast VLAN (308). In some cases, as discussed above with reference to FIGS. 1-2, the upstream VLAN is created by a multicast message specifying one or more characteristics of the upstream VLAN. In some cases, the downstream VLAN and the upstream VLAN operate on the same physical Local Area Network (LAN).

A different upstream message is received on the upstream VLAN (310). The different upstream message on the upstream VLAN is transmitted without processing (312).

Figure 4:
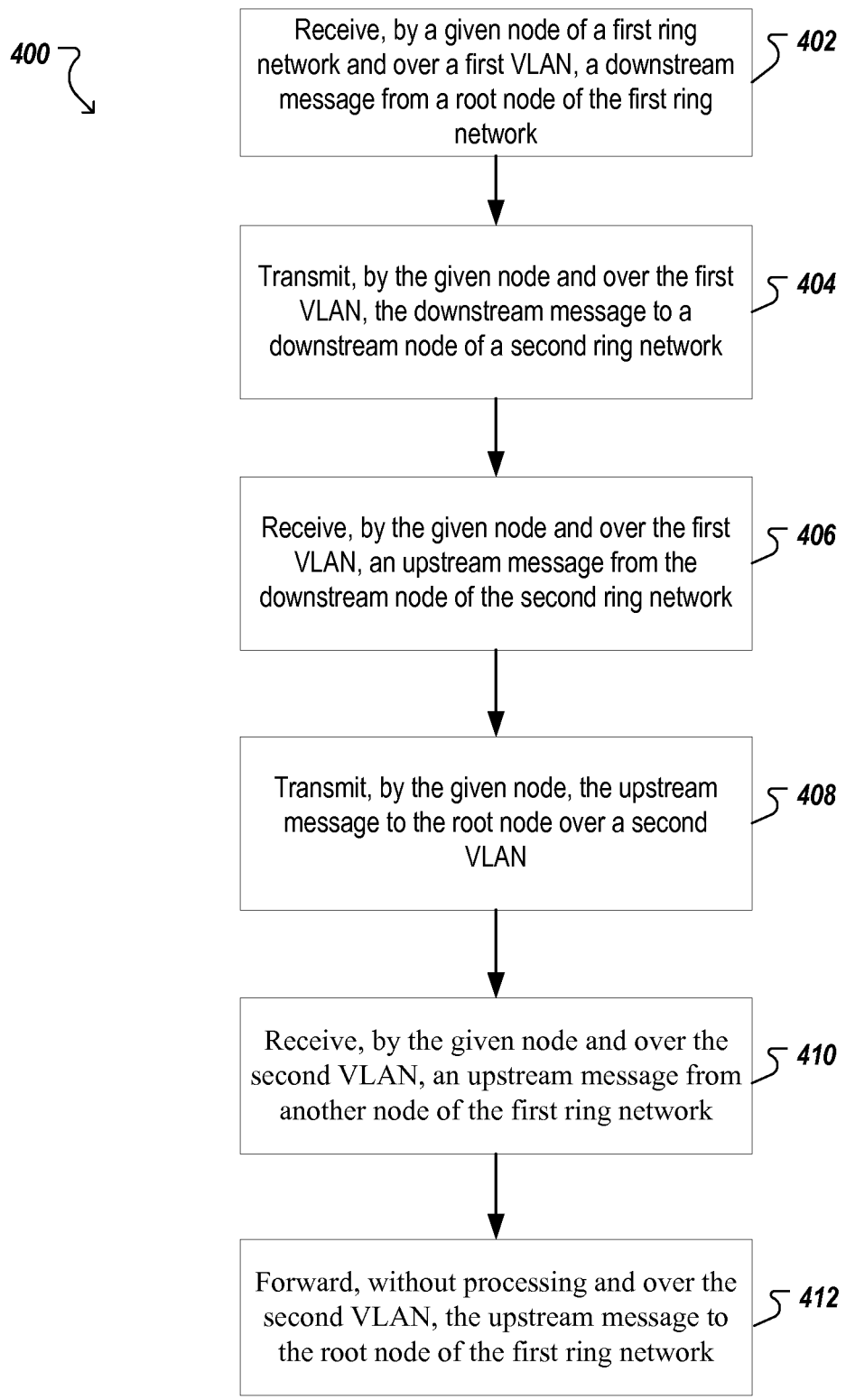
FIG. 4 is a flowchart of a second example process for processing stream messages.

FIG. 4 is a flowchart of an example process 400 for processing stream messages. The example process 400 can be performed, for example, by one or more devices such as those described with reference to FIGS. 1-2. The example process 400 can also be implemented as instructions stored on a non-transitory, computer-readable medium that, when executed by one or more devices, configures the one or more devices to perform and/or cause the one or more devices to perform the operations of the example process 400.

A downstream message is received from a root node of the first ring network (402). In some implementations, the downstream message is received by a given node of a first ring network and over a first VLAN. The downstream message is transmitted to a downstream node of a second ring network (404). The downstream message can be transmitted over the first VLAN by the given node. An upstream message is received from the downstream node of the second ring network (406). The upstream message can be received by the given node and over the first VLAN. The given node transmits the upstream message to the root node over a second VLAN by the given node (408). In some cases, as discussed above with reference to FIGS. 1-2, the given node receives an upstream message from another node of the first ring network over the second VLAN (410). The upstream message is forwarded, without processing, to the root node of the first ring network over the second VLAN (412).

Figure 5:
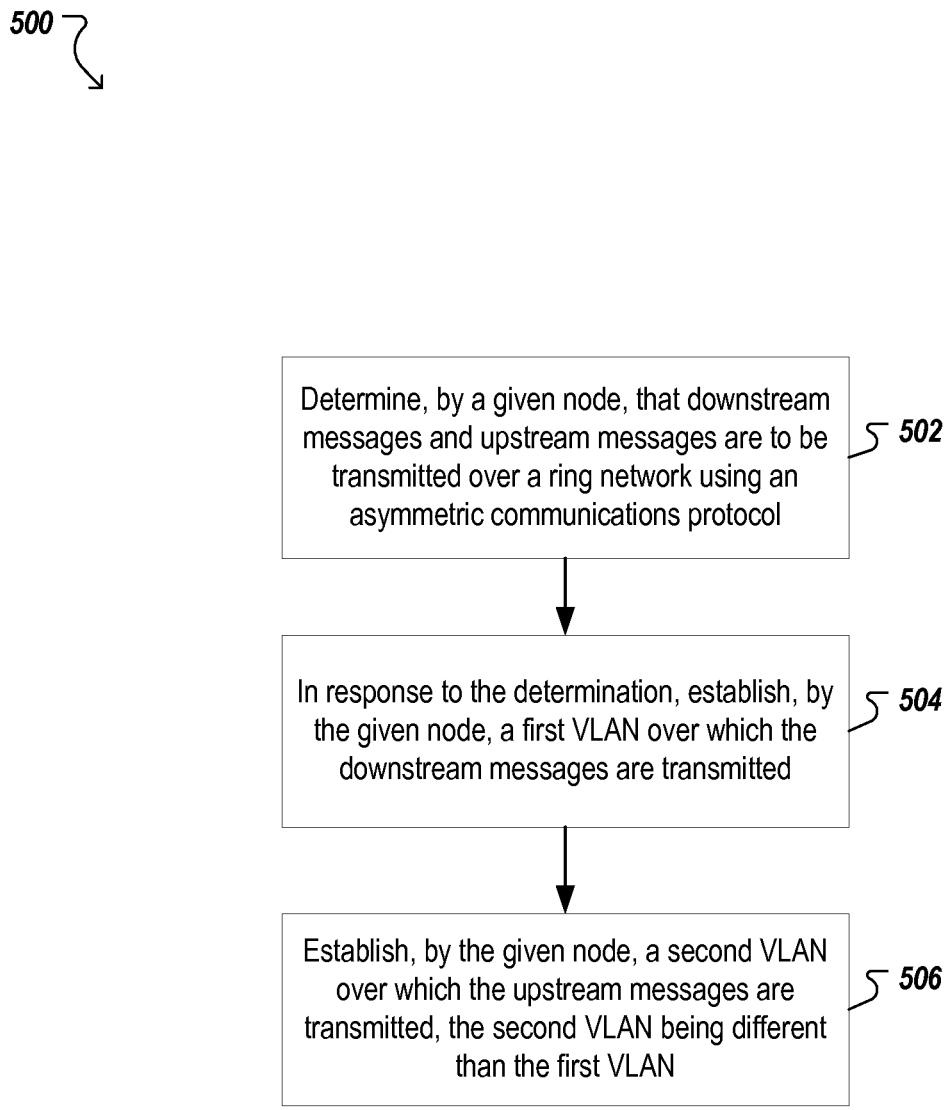
FIG. 5 is a flowchart of a third example process for processing stream messages.

FIG. 5 is a flowchart of an example process 500 for processing stream messages. The example process 500 can be performed, for example, by one or more devices such as those described with reference to FIGS. 1-2. The example process 500 can also be implemented as instructions stored on a non-transitory, computer-readable medium that, when executed by one or more devices, configures the one or more devices to perform and/or cause the one or more devices to perform the operations of the example process 500.

A given node determines that downstream messages and upstream messages are to be transmitted over a ring network using an asymmetric communications protocol (502). In response to the determination, the given node establishes a first VLAN over which the downstream messages are transmitted (504). The given node establishes a second VLAN, which is different than the first VLAN, over which the upstream messages are transmitted (506).

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination or in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results.

What is claimed is:

1. A method, comprising:
   receiving, over a downstream Virtual Local Area Network (VLAN), a downstream message formatted according to an asymmetric communication protocol; and
   in response to receiving the downstream message:
      generating an upstream message;
      transmitting the received downstream message on the downstream VLAN; and
      after transmitting the received downstream message on the downstream VLAN, transmitting the generated upstream message on an upstream VLAN that is different than the downstream VLAN.

2. The method of claim 1, wherein the upstream VLAN is created by a multicast message specifying one or more characteristics of the upstream VLAN.

3. The method of claim 1, further comprising:
   receiving a different upstream message on the upstream VLAN; and
   transmitting, without processing, the different upstream message on the upstream VLAN.

4. The method of claim 1, wherein the asymmetric communication protocol is an Internet Group Management Protocol (IGMP).

5. The method of claim 4, wherein the downstream message is an IGMP query message.

6. The method of claim 4, wherein the upstream message is an IGMP report message.

7. The method of claim 1, wherein the downstream VLAN and the upstream VLAN operate on the same physical Local Area Network (LAN).

8. A method, comprising:
   receiving, by a given node of a first ring network and over a first VLAN, a downstream message from a root node of the first ring network;
   in response to receiving the downstream message from the root node of the first ring network, transmitting, by the given node and over the first VLAN, the downstream message to a downstream node of a second ring network that is different than the first ring network, wherein the downstream node of the second ring network is a node of the first ring network;
   receiving, by the given node and over the first VLAN, an upstream message from the downstream node of the second ring network; and
   in response to receiving the upstream message from the downstream node of the second ring network, transmitting, by the given node, the upstream message to the root node over a second VLAN that is different than the first VLAN.

9. The method of claim 8, comprising:
receiving, by the given node and over the second VLAN, an upstream message from another node of the first ring network; and
forwarding, without processing and over the second VLAN, the upstream message to the root node of the first ring network.

10. A method comprising:
determining, by a given node, that downstream messages and upstream messages are to be transmitted over a ring network using an asymmetric communications protocol, wherein the given node is a root node of the ring network;
in response to the determination:
establishing, by the given node, a first VLAN over which the downstream messages are transmitted; and
establishing, by the given node, a second VLAN over which the upstream messages are transmitted, the second VLAN being different than the first VLAN.

11. A telecommunications device, comprising:
a communications interface that is configured to transmit and receive data packets over a telecommunications network; and
at least one hardware processor interoperably coupled with the communications interface and configured to:
in response to receiving a downstream message over a downstream Virtual Local Area Network (VLAN), the downstream message being formatted according to an asymmetric communication protocol:
generate an upstream message;
transmit the received downstream message on the downstream VLAN; and
after transmitting the received downstream message on the downstream VLAN, transmit the generated upstream message on an upstream VLAN that is different than the downstream VLAN.

12. The device of claim 11, wherein the upstream VLAN is created by a multicast message specifying one or more characteristics of the upstream VLAN.

13. The device of claim 11, wherein the at least one hardware processor is further configured to:
transmit, without processing, a different upstream message on the upstream VLAN in response to receiving the different upstream message on the upstream VLAN.

14. The device of claim 11, wherein the asymmetric communication protocol is an Internet Group Management Protocol (IGMP).

15. The device of claim 14, wherein the downstream message is an IGMP query message.

16. The device of claim 14, wherein the upstream message is an IGMP report message.

17. The device of claim 11, wherein the downstream VLAN and the upstream VLAN operate on the same physical Local Area Network (LAN).

18. A telecommunications node, comprising:
a communications interface that is configured to transmit and receive data packets over a telecommunications network; and
at least one hardware processor interoperably coupled with the memory and configured to:
receive, over a first VLAN, a downstream message from a root node of a first ring network;
in response to receiving the downstream message from the root node of the first ring network, transmit, over the first VLAN, the downstream message to a downstream node of a second ring network that is different than the first ring network, wherein the downstream node of the second ring network is a node of the first ring network;
receive, over the first VLAN, an upstream message from the downstream node of the second ring network; and
in response to receiving the upstream message from the downstream node of the second ring network, transmit the upstream message to the root node over a second VLAN that is different than the first VLAN.

19. The device of claim 18, wherein the at least one hardware processor is further configured to:
receive, over the second VLAN, an upstream message from another node of the first ring network; and
forward, without processing and over the second VLAN, the upstream message to the root node of the first ring network.

20. A telecommunications device, comprising:
a communications interface that is configured to transmit and receive data packets over a telecommunications network; and
at least one hardware processor interoperably coupled with the memory and configured to:
determine that downstream messages and upstream messages are to be transmitted over a ring network using an asymmetric communications protocol, wherein the telecommunications device is a root node of the ring network;
in response to the determination:
establish a first VLAN over which the downstream messages are transmitted; and
establish a second VLAN over which the upstream messages are transmitted, the second VLAN being different than the first VLAN.

21. A non-transitory, computer-readable medium storing computer-readable instructions executable by a computer and configured to:
receive, over a downstream Virtual Local Area Network (VLAN), a downstream message formatted according to an asymmetric communication protocol; and
in response to receiving the downstream message:
generate an upstream message;
transmit the received downstream message on the downstream VLAN; and
after transmitting the received downstream message on the downstream VLAN, transmit the generated upstream message on an upstream VLAN that is different than the downstream VLAN.

22. A non-transitory, computer-readable medium storing computer-readable instructions executable by a computer and configured to:
receive, by a given node of a first ring network and over a first VLAN, a downstream message from a root node of the first ring network;
in response to receiving the downstream message from the root node of the first ring network, transmit, by the given node and over the first VLAN, the downstream message to a downstream node of a second ring network that is different than the first ring network, wherein the downstream node of the second ring network is a node of the first ring network;
receive, by the given node and over the first VLAN, an upstream message from the downstream node of the second ring network; and in response to receiving the upstream message from the downstream node of the second ring network, transmit, by the given node, the upstream message to the root node over a second VLAN that is different than the first VLAN.

23. A non-transitory, computer-readable medium storing computer-readable instructions executable by a computer and configured to:
  determine, by a given node, that downstream messages and upstream messages are to be transmitted over a ring network using an asymmetric communications protocol, wherein the given node is a root node of the ring network;
  in response to the determination:
    establish, by the given node, a first VLAN over which the downstream messages are transmitted; and
    establish, by the given node, a second VLAN over which the upstream messages are transmitted, the second VLAN being different than the first VLAN.

* * * * *

UNITED STATES PATENT AND TRADEMARK OFFICE
CERTIFICATE OF CORRECTION

PATENT NO. : 9,819,514 B2
APPLICATION NO. : 14/697055
DATED : November 14, 2017
INVENTOR(S) : Milton Jay Johnson It is certified that error appears in the above-identified patent and that said Letters Patent is hereby corrected as shown below:

In the Claims

In Column 12, Line 19, Claim 19, please delete "device" and insert --telecommunications node--, therefor Signed and Sealed this
Fourth Day of December, 2018

Andrei Iancu
*Director of the United States Patent and Trademark Office*